United States Patent
Diao et al.

(10) Patent No.: US 9,638,804 B2
(45) Date of Patent: May 2, 2017

(54) METHOD FOR TRANSMITTING PSEUDOLITE SYSTEM MESSAGES, PSEUDOLITE POSITIONING SYSTEM AND ASSOCIATED DEVICE

(71) Applicant: ZTE Corporation, Shenzhen, Guangdong (CN)

(72) Inventors: Xinxi Diao, Shenzhen (CN); Yiqing Cao, Shenzhen (CN); Zhifeng Ma, Shenzhen (CN); Linhui Wei, Shenzhen (CN); Qun Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/649,290

(22) PCT Filed: Sep. 16, 2013

(86) PCT No.: PCT/CN2013/083564
§ 371 (c)(1),
(2) Date: Jun. 3, 2015

(87) PCT Pub. No.: WO2014/090001
PCT Pub. Date: Jun. 19, 2014

(65) Prior Publication Data
US 2015/0301184 A1     Oct. 22, 2015

(30) Foreign Application Priority Data
Dec. 12, 2012 (CN) .......................... 2012 1 0535369

(51) Int. Cl.
*H04W 72/00* (2009.01)
*G01S 19/11* (2010.01)
(Continued)

(52) U.S. Cl.
CPC ............... *G01S 19/11* (2013.01); *G01S 1/042* (2013.01); *H04W 4/02* (2013.01); *H04W 72/005* (2013.01);
(Continued)

(58) Field of Classification Search
CPC ........................... H04W 24/00; H04W 72/082
(Continued)

(56) References Cited

U.S. PATENT DOCUMENTS 6,101,178 A   8/2000  Beal
6,198,432 B1  3/2001  Janky
(Continued)

FOREIGN PATENT DOCUMENTS

CN          1584626 A    2/2005
CN        101221233 A    7/2008
(Continued)

OTHER PUBLICATIONS

International Search Report in international application No. PCT/CN2013/083564, mailed on Dec. 26, 2013.
(Continued)

*Primary Examiner* — Chuck Huynh
(74) *Attorney, Agent, or Firm* — Oppedahl Patent Law Firm LLC (57) ABSTRACT

Disclosed is a method for transmitting pseudolite system messages, the method including: pseudolite sends pseudolite node parameters of the pseudolite to which a positioning system messages broadcast channel belongs, and pseudolite node parameters of the pseudolite adjacent or nearby to the pseudolite to which the positioning system messages broadcast channel belongs, in the configured positioning system messages broadcast channel. A method for transmitting indication message of the positioning system messages broadcast channel is also disclosed in the present invention, (Continued)

the method including: a wireless access point sends an indication message of the positioning system messages broadcast channel of the pseudolite to a radio positioning terminal in its service area. According to the indication message of the positioning system messages broadcast channel, the radio positioning terminal accesses corresponding the positioning system messages broadcast channel, and surveys the positioning signal and/or positioning based on the node parameters obtained from the positioning system messages broadcast channel. A pseudolite positioning system and associated device are also disclosed in the present invention. By the present invention, it is possible to reduce the occupancy for the wireless access point in the pseudolite positioning.

8 Claims, 2 Drawing Sheets

(51) Int. Cl.
| | |
|---|---|
| *H04W 4/02* | (2009.01) |
| *H04W 72/04* | (2009.01) |
| *G01S 1/04* | (2006.01) |
| *H04W 88/08* | (2009.01) |
| *G01S 5/02* | (2010.01) |

(52) U.S. Cl.
CPC ......... *H04W 72/048* (2013.01); *G01S 5/0236* (2013.01); *H04W 88/08* (2013.01)

(58) Field of Classification Search
USPC .............................. 455/452.1, 457; 370/336
See application file for complete search history.

(56) References Cited

U.S. PATENT DOCUMENTS

| | | | |
|---|---|---|---|
| 6,597,988 | B1 | 7/2003 | Brodie |
| 6,653,976 | B1 | 11/2003 | Janky |
| 6,771,625 | B1* | 8/2004 | Beal ...................... G01S 5/0027 370/336 |
| 2010/0073229 | A1* | 3/2010 | Pattabiraman .......... G01S 19/11 342/357.64 |
| 2013/0063301 | A1 | 3/2013 | Pattabiraman |
| 2013/0120188 | A1 | 5/2013 | Pattabiraman |
| 2014/0055300 | A1 | 2/2014 | Raghupathy et al. |
| 2014/0292580 | A1 | 10/2014 | Raghupathy et al. |
| 2015/0289089 | A1 | 10/2015 | Raghupathy et al. |

FOREIGN PATENT DOCUMENTS

| | | |
|---|---|---|
| CN | 102204396 A | 9/2011 |
| JP | 2011242192 A | 12/2011 |
| JP | 2012502299 A | 1/2012 |
| WO | 2010030825 A1 | 3/2010 |

OTHER PUBLICATIONS

English Translation of the Written Opinion of the International Search Authority in international application No. PCT/CN2013/083564, mailed on Dec. 26, 2013.
Supplementary European Search Report in European application No. 13862827.6, mailed on Dec. 8, 2015.

* cited by examiner

METHOD FOR TRANSMITTING PSEUDOLITE SYSTEM MESSAGES, PSEUDOLITE POSITIONING SYSTEM AND ASSOCIATED DEVICE

TECHNICAL FIELD

The disclosure relates to the field of radio positioning, and in particular to a method for pseudolite system messaging, pseudolite positioning system, and devices thereof.

BACKGROUND

With proposal of a concept of pseudolite and continuous improvement of hardware technology thereof, a pseudolite positioning system has found its application in aspects such as indoor application, underground application, flight navigation, Mars probing, etc. A pseudolite may team up with a space orbit navigation positioning satellite in multiple modes, forming a system for positioning and navigation. A pseudolite notably features a low elevation angle, and a signal not required to pass through the Ionosphere. With such a satellite with a low elevation angle, the combination of a space orbit navigation positioning satellite and a pseudolite may effectively improve a geometrical structure, increasing accuracy in vertical positioning. In a special case, a pseudolite may even completely replace a space orbit navigation positioning satellite and perform independent positioning. The fundamental of pseudolite positioning (that is, positioning by pseudolite) still lies in use of a double-difference method as in relative positioning by a space orbit navigation positioning satellite. Reliability and accuracy of such a method may depend on both hardware equipment and geometrical configuration of a pseudolite.

An existing solution for implementing a pseudolite positioning system may be as follows, for example.

US patent application of Publication No. U.S. Pat. No. 6,597,988 (titled "Network assisted pseudolite acquisition for enhanced GPS navigation") has disclosed a system including a pseudolite location database storing information on a location of at least one pseudolite and the at least one pseudolite deployed in a certain area; and a method for sending a satellite positioning receiver at least part of the information in the pseudolite location database containing at least part a pseudolite location information;

the pseudolite location database is read by a cellular phone base station; communication with the positioning receiver is through a cellular mobile communication system; in implementation a pseudolite location is sent to the cellular mobile communication system; information for codeword search is sent to the satellite positioning receiver before positioning;

the communication may also be unidirectional broadcast; the unidirectional broadcast may be implemented by a frequency modulated broadcast station.

An interface for a satellite positioning receiver may be configured for inputting pseudolite information, local pseudolite information is used selectively by a satellite positioning receiver; the interface is separate from an antenna for receiving a satellite positioning signal; the local pseudolite information may include a number of a pseudo random sequence used by a pseudolite and a position of the pseudolite.

In an actual application, a cellular base station may be required to periodically send information on geographical coordinates and pseudo-random codes of pseudolites as required by a pseudolite positioning receiver, which may occupy lots of downlink capacity of the cellular base station.

SUMMARY

Embodiments herein provide a method for pseudolite system messaging, pseudolite positioning system, and devices thereof in order to lower wireless access point capacity occupation during pseudolite system messaging.

To this end, a technology solution herein may be implemented as follows.

According to an embodiment herein, a method for pseudolite system messaging may include:

sending, by a pseudolite on a configured positioning system message broadcast channel, a node parameter of the pseudolite corresponding to the positioning system message broadcast channel, and a node parameter of a pseudolite adjacent to or close to the pseudolite corresponding to the positioning system message broadcast channel.

The method may further include:

further sending, by the pseudolite on the configured positioning system message broadcast channel, information on a positioning signal transmitting mode for transmitting a positioning signal by the pseudolite corresponding to the positioning system message broadcast channel, and information on a positioning signal transmitting mode for transmitting a positioning signal by the pseudolite adjacent to or close to the pseudolite corresponding to the positioning system message broadcast channel.

The information on the positioning signal transmitting mode corresponding to a pseudolite may include information on a period of time in which a positioning signal is transmitted and/or information on a period of time in which no positioning signal is transmitted.

The node parameter of a pseudolite may include information on geographical coordinates of the pseudolite and/or information on a pseudo random sequence used in a positioning signal transmitted by the pseudolite.

According to an embodiment herein, a method for sending a positioning system message broadcast channel indication may include:

sending, by a wireless access point, a radio positioning User Equipment UE in a service area of the wireless access point a positioning system message broadcast channel indication indicating a positioning system message broadcast channel of a pseudolite;

accessing, by the radio positioning UE, the positioning system message broadcast channel indicated by the positioning system message broadcast channel indication; acquiring a node parameter from the positioning system message broadcast channel; and performing positioning signal measurement and/or performing positioning according to the acquired node parameter. The node parameter may include a node parameter of the pseudolite corresponding to the positioning system message broadcast channel, and a node parameter of a pseudolite adjacent to or close to the pseudolite corresponding to the positioning system message broadcast channel.

The positioning system message broadcast channel indication may include at least one of:

time occupation by the positioning system message broadcast channel of the pseudolite;

frequency occupation by the positioning system message broadcast channel of the pseudolite; and indication of a pseudo random sequence or a group of pseudo random sequences required by data on the positioning system message broadcast channel of the pseudolite.

The wireless access point may include one of:

a wireless access point of a micro cell of a wireless access network;

a wireless access point of a macro cell of the wireless access network; and an access point of a Wireless Local Area Network.

The wireless access point may send the positioning system message broadcast channel indication through System Information Broadcasting SIB.

According to an embodiment herein, a device for sending a pseudolite positioning signal may include:

a positioning system messaging module configured for: sending, on a configured positioning system message broadcast channel, a node parameter of a pseudolite corresponding to the positioning system message broadcast channel, and a node parameter of a pseudolite adjacent to or close to the pseudolite corresponding to the positioning system message broadcast channel; and a positioning signaling module configured for: sending, through a positioning signal transmitting channel, a radio positioning signal.

The positioning system messaging module may be further configured for: sending, on the configured positioning system message broadcast channel, information on a positioning signal transmitting mode for transmitting a positioning signal by the pseudolite corresponding to the positioning system message broadcast channel, and information on a positioning signal transmitting mode for transmitting a positioning signal by the pseudolite adjacent to or close to the pseudolite corresponding to the positioning system message broadcast channel.

The information on the positioning signal transmitting mode corresponding to a pseudolite may include information on a period of time in which a positioning signal is transmitted and/or information on a period of time in which no positioning signal is transmitted.

The node parameter of a pseudolite may include information on geographical coordinates of the pseudolite and/or information on a pseudo random sequence used in a positioning signal transmitted by the pseudolite.

The device may further include a receiving module facing a network side, configured for: receiving control signaling from the network side through a receiving channel, and a node parameter of a pseudolite adjacent to or close to the device for sending a pseudolite positioning signal.

The receiving module facing the network side may be further configured for: receiving, from the network side through the receiving channel, operating mode configuration for configuring an operating mode of the device for sending a pseudolite positioning signal. The operating mode configuration may include at least one of:

a transmitting power of the positioning signal transmitting Channel;

a transmitting timing of the positioning signal transmitting Channel;

a transmitting frequency of the positioning signal transmitting Channel;

a duty cycle of the positioning signal transmitting Channel; and a positioning signal modulation mode.

The device for sending a pseudolite positioning signal may further include a pseudolite registering module configured for: sending, through a pseudolite registering channel, a wireless access point a node parameter of the device for sending a pseudolite positioning signal. The node parameter of the device for sending a pseudolite positioning signal may include at least one of:

information on geographical coordinates of the device for sending a pseudolite positioning signal;

a maximal transmitting power of the device for sending a pseudolite positioning signal; and an operating frequency band supported by the positioning signal transmitting channel of the device for sending a pseudolite positioning signal.

According to an embodiment herein, a wireless access point may include:

a pseudolite system message broadcast channel indicating module configured for: sending, through a satellite system message broadcast channel indicating channel, a radio positioning User Equipment UE in a service area of the wireless access point a positioning system message broadcast channel indication indicating a positioning system message broadcast channel of a pseudolite.

The positioning system message broadcast channel indication may include at least one of:

time occupation by the positioning system message broadcast channel of the pseudolite;

frequency occupation by the positioning system message broadcast channel of the pseudolite; and indication of a pseudo random sequence or a group of pseudo random sequences required by demodulation of data on the positioning system message broadcast channel of the pseudolite.

The wireless access point may further include a pseudolite parameter receiving module configured for: receiving, from a pseudolite registering channel of a device for sending a pseudolite positioning signal, a node parameter of the device for sending a pseudolite positioning signal. The node parameter of the device for sending a pseudolite positioning signal may include at least one of:

information on geographical coordinates of the device for sending a pseudolite positioning signal;

a maximal transmitting power of the device for sending a pseudolite positioning signal; and an operating frequency band supported by a positioning signal transmitting channel of the device for sending a pseudolite positioning signal.

The wireless access point may further include a pseudolite operating parameter configuring module configured for: configuring, through a pseudolite operating parameter configuring channel, operating mode configuration for configuring an operating mode of a device for sending a pseudolite positioning signal. The operating mode configuration may include at least one of:

a transmitting power of a positioning signal transmitting Channel;

a transmitting timing of the positioning signal transmitting Channel;

a transmitting frequency of the positioning signal transmitting Channel;

a duty cycle of the positioning signal transmitting Channel; and a positioning signal modulation mode.

The wireless access point may be one of a wireless access point of a micro cell of a wireless access network;

a wireless access point of a macro cell of the wireless access network; and an access point of a Wireless Local Area Network.

According to an embodiment herein, a radio positioning User Equipment UE may include an indication receiving module and a node parameter acquiring module.

The indication receiving module configured for: receiving a positioning system message broadcast channel indication sent by a wireless access point. The positioning system message broadcast channel indication may indicate a positioning system message broadcast channel of a pseudolite.

The node parameter acquiring module configured for: accessing the positioning system message broadcast channel indicated by the positioning system message broadcast channel indication; acquiring, from the positioning system message broadcast channel, a node parameter of the pseudolite corresponding to the positioning system message broadcast channel, and a node parameter of a pseudolite adjacent to or close to the pseudolite corresponding to the positioning system message broadcast channel.

The radio positioning UE may further include a measuring positioning module configured for: performing positioning signal measurement and/or performing positioning according to the acquired node parameters.

According to an embodiment herein, a pseudolite positioning system may include at least one radio positioning User Equipment UE herein and two or more devices for sending a pseudolite positioning signal herein.

The pseudolite positioning system may further include a managing unit for managing a device for sending a pseudolite positioning signal. The managing unit may be configured for: acquiring a node parameter of a device for sending a pseudolite positioning signal and a node parameter of a device for sending a pseudolite positioning signal adjacent to or close to the device for sending a pseudolite positioning signal; sending the device for sending a pseudolite positioning signal adjacent to or close to the device for sending a pseudolite positioning signal at least one node parameter of the device for sending a pseudolite positioning signal through a downlink channel of the at least one wireless access point.

The managing unit may be further configured for: configuring, through the at least one wireless access point, operating mode configuration for configuring an operating mode of a device for sending a pseudolite positioning signal. The operating mode configuration may include at least one of:

a transmitting power of a positioning signal transmitting Channel;

a transmitting timing of the positioning signal transmitting Channel;

a transmitting frequency of the positioning signal transmitting Channel;

a duty cycle of the positioning signal transmitting Channel; and a positioning signal modulation mode.

With a method for pseudolite system messaging, pseudolite positioning system, and devices thereof according to embodiments herein, a wireless access point may send only a positioning system message broadcast channel indication (such as time and a frequency used by SIB of a pseudolite), without sending a node parameter of a pseudolite (such as information on geographical coordinates of the pseudolite and a pseudo random sequence used in a positioning signal transmitted by the pseudolite), thereby lowing wireless access point capacity occupation.

DETAILED DESCRIPTION

A technical solution herein is elaborated below with reference to drawings and embodiments.

Figure 1:
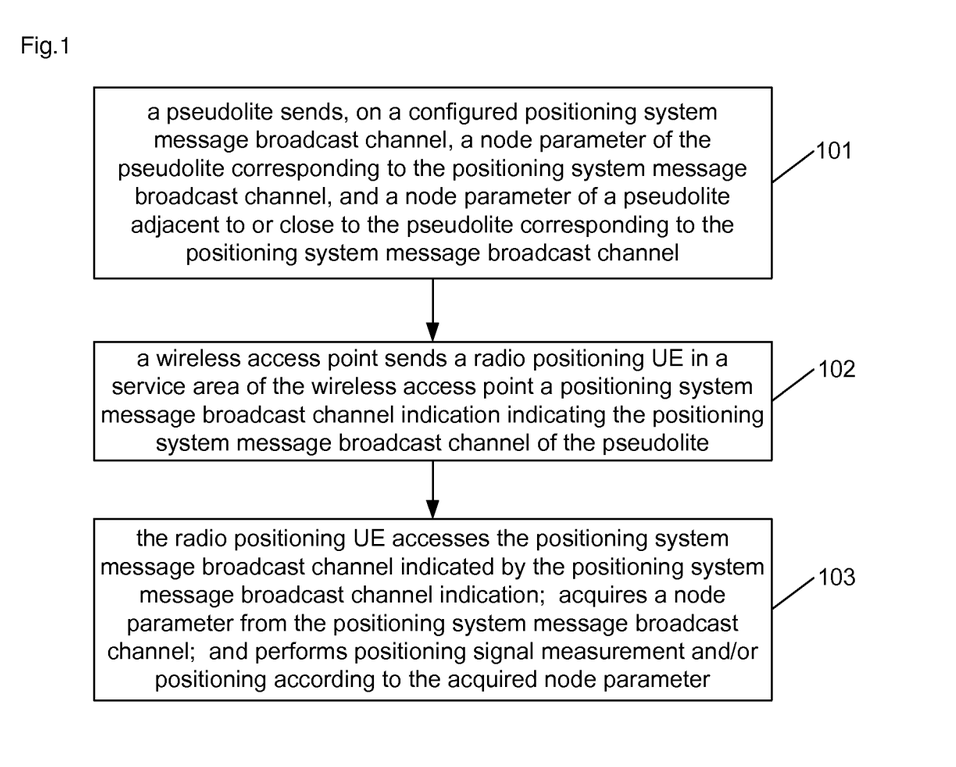
FIG. 1 is a flowchart of a pseudolite positioning method according to an embodiment herein.

A pseudolite positioning method according to an embodiment herein, as shown in FIG. 1, may mainly include steps as follows.

In step 101, a pseudolite sends, on a configured positioning system message broadcast channel, a node parameter of the pseudolite corresponding to the positioning system message broadcast channel, and a node parameter of a pseudolite adjacent to or close to the pseudolite corresponding to the positioning system message broadcast channel.

A positioning system message broadcast channel of a pseudolite system may be configured on a pseudolite. The pseudolite may send, on the positioning system message broadcast channel, the node parameter of the pseudolite corresponding to the system message broadcast channel, and the node parameter of the pseudolite adjacent to or close to the pseudolite corresponding to the system message broadcast channel.

The node parameter of a pseudolite may include information on geographical coordinates of the pseudolite and/or information on a pseudo random sequence used in a positioning signal transmitted by the pseudolite.

The pseudolite may be further configured for: sending, on the configured positioning system message broadcast channel, information on a positioning signal transmitting mode for transmitting a positioning signal by the pseudolite corresponding to the positioning system message broadcast channel, and information on a positioning signal transmitting mode for transmitting a positioning signal by the pseudolite adjacent to or close to the pseudolite corresponding to the positioning system message broadcast channel.

The information on the positioning signal transmitting mode corresponding to the pseudolite may include information on a period of time in which a positioning signal is transmitted and/or information on a period of time in which no positioning signal is transmitted.

In step 102, a wireless access point sends a radio positioning UE in a service area of the wireless access point a positioning system message broadcast channel indication indicating the positioning system message broadcast channel of the pseudolite.

The positioning system message broadcast channel indication may include at least one of:

time occupation by the positioning system message broadcast channel of the pseudolite;

frequency occupation by the positioning system message broadcast channel of the pseudolite; and indication of a pseudo random sequence or a group of pseudo random sequences required by demodulation of data on the positioning system message broadcast channel of the pseudolite.

The wireless access point may be one of: a wireless access point of a micro cell of a wireless access network; a wireless access point of a macro cell of the wireless access network; and an access point of a Wireless Local Area Network.

The wireless access point may send the positioning system message broadcast channel indication through System Information Broadcasting SIB.

In step 103, the radio positioning UE accesses the positioning system message broadcast channel indicated by the positioning system message broadcast channel indication; acquires a node parameter from the positioning system message broadcast channel; and performs positioning signal measurement and/or positioning according to the acquired node parameter. The node parameter may include a node parameter of the pseudolite corresponding to the positioning system message broadcast channel, and a node parameter of a pseudolite adjacent to or close to the pseudolite corresponding to the positioning system message broadcast channel.

The wireless access point may send only a positioning system message broadcast channel indication, without sending a node parameter of a pseudolite, thereby lowing wireless access point capacity occupation.

Based on the pseudolite positioning method, an embodiment herein may further provide pseudolite system messaging, including steps as follows.

A positioning system message broadcast channel may be configured on a pseudolite. The pseudolite may send, on the configured positioning system message broadcast channel, at least one of:

1) a node parameter of the pseudolite corresponding to the positioning system message broadcast channel, and a node parameter of a pseudolite adjacent to or close to the pseudolite corresponding to the positioning system message broadcast channel; and 2) information on a positioning signal transmitting mode for transmitting a positioning signal by the pseudolite corresponding to the positioning system message broadcast channel, and information on a positioning signal transmitting mode for transmitting a positioning signal by the pseudolite adjacent to or close to the pseudolite corresponding to the positioning system message broadcast channel.

The node parameter of the pseudolite may include information on geographical coordinates of the pseudolite and/or information on a pseudo random sequence used in a positioning signal transmitted by the pseudolite.

The information on the positioning signal transmitting mode corresponding to a pseudolite may include information on a period of time in which a positioning signal is transmitted and/or information on a period of time in which no positioning signal is transmitted.

A positioning system message broadcast channel may be configured on a pseudolite as follows.

The positioning system message broadcast channel may be configured on a spectrum used in sending a positioning signal by the pseudolite.

Alternatively, the positioning system message broadcast channel may be configured on a spectrum other than the spectrum used in sending a positioning signal by the pseudolite.

The spectrum other than the spectrum used in sending a positioning signal by the pseudolite may be a licensed spectrum of a mobile communication system or a license-free spectrum.

The pseudolite may be a radio positioning signaling device in or around the service area of the wireless access point.

Figure 2:
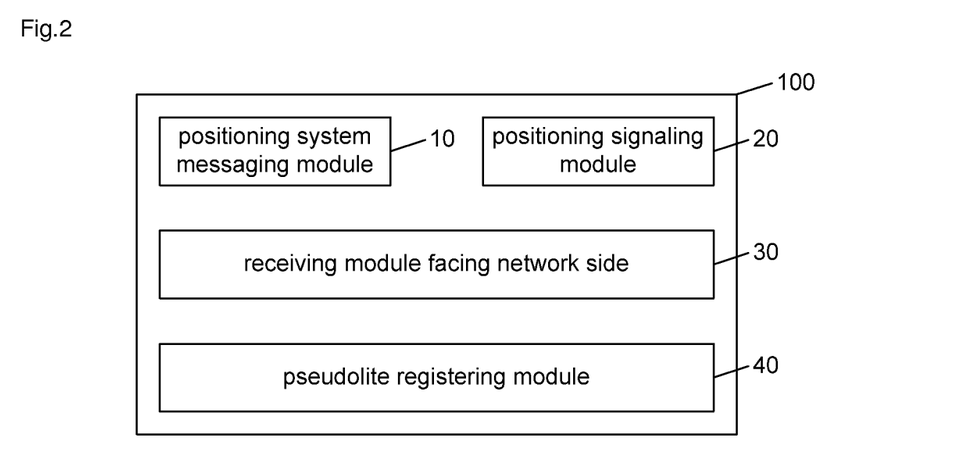
FIG. 2 is a diagram of a structure of a device for sending a pseudolite positioning signal according to an embodiment herein.

Corresponding to the pseudolite system messaging, an embodiment herein may further provide a device 100 for sending a pseudolite positioning signal. As shown in FIG. 2, the device for sending a pseudolite positioning signal may include a positioning system messaging module and a positioning signaling module.

The positioning system messaging module 10 may be configured for: sending, on a configured positioning system message broadcast channel, a node parameter of a pseudolite corresponding to the positioning system message broadcast channel, and a node parameter of a pseudolite adjacent to or close to the pseudolite corresponding to the positioning system message broadcast channel. The node parameter of the pseudolite may include information on geographical coordinates of the pseudolite and/or information on a pseudo random sequence used in a positioning signal transmitted by the pseudolite.

The positioning signaling module 20 may be configured for: sending, through a positioning signal transmitting channel, a radio positioning signal.

The positioning system messaging module 10 may further be configured for: sending, on the configured positioning system message broadcast channel, information on a positioning signal transmitting mode for transmitting a positioning signal by the pseudolite corresponding to the positioning system message broadcast channel, and information on a positioning signal transmitting mode for transmitting a positioning signal by the pseudolite adjacent to or close to the pseudolite corresponding to the positioning system message broadcast channel.

The information on the positioning signal transmitting mode corresponding to a pseudolite may include information on a period of time in which a positioning signal is transmitted and/or information on a period of time in which no positioning signal is transmitted.

The device for sending a pseudolite positioning signal may further include a receiving module 30 facing a network side. The receiving module facing the network side may be configured for: receiving control signaling from the network side through a receiving channel, and a node parameter of a pseudolite adjacent to or close to the device for sending a pseudolite positioning signal. The receiving module facing the network side may further be configured for: receiving, from the network side through the receiving channel, operating mode configuration for configuring an operating mode of the device for sending a pseudolite positioning signal. The operating mode configuration may include at least one of:

a transmitting power of the positioning signal transmitting Channel (controlling zero power transmitting or non-zero power on the transmitting Channel);

a transmitting timing of the positioning signal transmitting Channel (a configured time window or starting time according to which the device for sending a pseudolite positioning signal may send a positioning signal);

a transmitting frequency of the positioning signal transmitting Channel;

a duty cycle of the positioning signal transmitting Channel; and a positioning signal modulation mode.

The device for sending a pseudolite positioning signal may further include a pseudolite registering module 40. The pseudolite registering module may be configured for: sending, through a pseudolite registering channel, a wireless access point a node parameter of the device for sending a pseudolite positioning signal. The node parameter of the device for sending a pseudolite positioning signal may include at least one of:

information on geographical coordinates of the device for sending a pseudolite positioning signal;

a maximal transmitting power of the device for sending a pseudolite positioning signal; and an operating frequency band supported by the positioning signal transmitting channel of the device for sending a pseudolite positioning signal.

In addition, the positioning system messaging module 10, the positioning signaling module 20, the receiving module 30 facing the network side, and the pseudolite registering module 40 each may be implemented by hardware having a communication function in the device for sending a pseudolite positioning signal.

An embodiment herein may further provide a method for sending a pseudolite positioning system message broadcast channel indication, including steps as follows.

A wireless access point may send a radio positioning User Equipment UE in a service area of the wireless access point a positioning system message broadcast channel indication indicating a positioning system message broadcast channel of a pseudolite. The positioning system message broadcast channel indication may include at least one of:

1) time occupation by the positioning system message broadcast channel of the pseudolite;

2) frequency occupation by the positioning system message broadcast channel of the pseudolite; and 3) indication of a pseudo random sequence or a group of pseudo random sequences required by demodulation of data on the positioning system message broadcast channel of the pseudolite;

The radio positioning UE may be configured for: accessing the positioning system message broadcast channel indicated by the positioning system message broadcast channel indication; acquiring a node parameter from the positioning system message broadcast channel; and performing positioning signal measurement and/or performing positioning according to the acquired node parameter. The node parameter may include a node parameter of the pseudolite corresponding to the positioning system message broadcast channel, and a node parameter of a pseudolite adjacent to or close to the pseudolite corresponding to the positioning system message broadcast channel.

The wireless access point may be one of:

1) a wireless access point of a micro cell of a wireless access network;

2) a wireless access point of a macro cell of the wireless access network; and 3) an access point of a Wireless Local Area Network.

The pseudolite may be a radio positioning signaling device in or around the service area of the wireless access point.

A positioning signal sent by the pseudolite may or may not follow an orbit navigation positioning satellite technical specification.

The wireless access point may send the positioning system message broadcast channel indication by cell-facing SIB.

Figure 3:
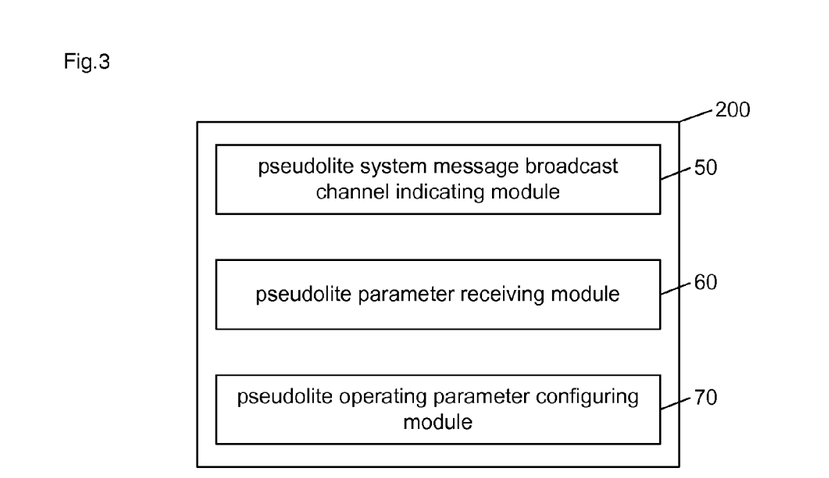
FIG. 3 is a diagram of a structure of a wireless access point according to an embodiment herein.

Corresponding to the method for sending a pseudolite positioning system message broadcast channel indication, an embodiment herein may further provide a wireless access point 200 assisting pseudolite positioning. As shown in FIG. 3, the wireless access point may include a pseudolite system message broadcast channel indicating module.

The pseudolite system message broadcast channel indicating module 50 may be configured for: sending, through a satellite system message broadcast channel indicating channel, a radio positioning User Equipment UE in a service area of the wireless access point a positioning system message broadcast channel indication indicating a positioning system message broadcast channel of a pseudolite. The positioning system message broadcast channel indication may include at least one of:

time occupation by the positioning system message broadcast channel of the pseudolite;

frequency occupation by the positioning system message broadcast channel of the pseudolite; and indication of a pseudo random sequence or a group of pseudo random sequences required by demodulation of data on the positioning system message broadcast channel of the pseudolite.

The wireless access point may further include a pseudolite parameter receiving module 60. The pseudolite parameter receiving module may be configured for: receiving, from a pseudolite registering channel of a device for sending a pseudolite positioning signal, a node parameter of the device for sending a pseudolite positioning signal. The node parameter of the device for sending a pseudolite positioning signal may include at least one of:

information on geographical coordinates of the device for sending a pseudolite positioning signal;

a maximal transmitting power of the device for sending a pseudolite positioning signal; and an operating frequency band supported by a positioning signal transmitting channel of the device for sending a pseudolite positioning signal.

The wireless access point may further include a pseudolite operating parameter configuring module 70. The pseudolite operating parameter configuring module may be configured for: configuring, through a pseudolite operating parameter configuring channel, operating mode configuration for configuring an operating mode of a device for sending a pseudolite positioning signal. The operating mode configuration may include at least one of:

a transmitting power of a positioning signal transmitting Channel;

a transmitting timing of the positioning signal transmitting Channel;

a transmitting frequency of the positioning signal transmitting Channel;

a duty cycle of the positioning signal transmitting Channel;

a positioning signal modulation mode.

In addition, the pseudolite system message broadcast channel indicating module 50 may be implemented collaboratively by a Central Processing Unit CPU, a Micro Processing Unit MPU, a Digital Signal Processor DSP, or a Field-Programmable Gate Array FPGA in the wireless access point, and hardware having a communication function in the wireless access point.

The pseudolite parameter receiving module 60 may be implemented by hardware having a communication function in the wireless access point.

The pseudolite operating parameter configuring module 70 may be implemented by a CPU, an MPU, a DSP, or an FPGA in the wireless access point.

An embodiment herein may further provide a radio positioning UE. The radio positioning UE may include an indication receiving module and a node parameter acquiring module.

The indication receiving module may be configured for: receiving a positioning system message broadcast channel indication sent by a wireless access point. The positioning system message broadcast channel indication may indicate a positioning system message broadcast channel of a pseudolite.

The node parameter acquiring module may be configured for: accessing the positioning system message broadcast channel indicated by the positioning system message broadcast channel indication; acquiring, from the positioning system message broadcast channel, a node parameter of the pseudolite corresponding to the positioning system message broadcast channel, and a node parameter of a pseudolite adjacent to or close to the pseudolite corresponding to the positioning system message broadcast channel.

The radio positioning UE may further include a measuring positioning module configured for: performing positioning signal measurement and/or performing positioning according to the acquired node parameters.

In addition, the indication receiving module may be implemented by hardware having a communication function in the radio positioning UE.

The node parameter acquiring module, the measuring positioning module each may be implemented by a CPU, an MPU, a DSP, or an FPGA in the radio positioning UE.

Figure 4:
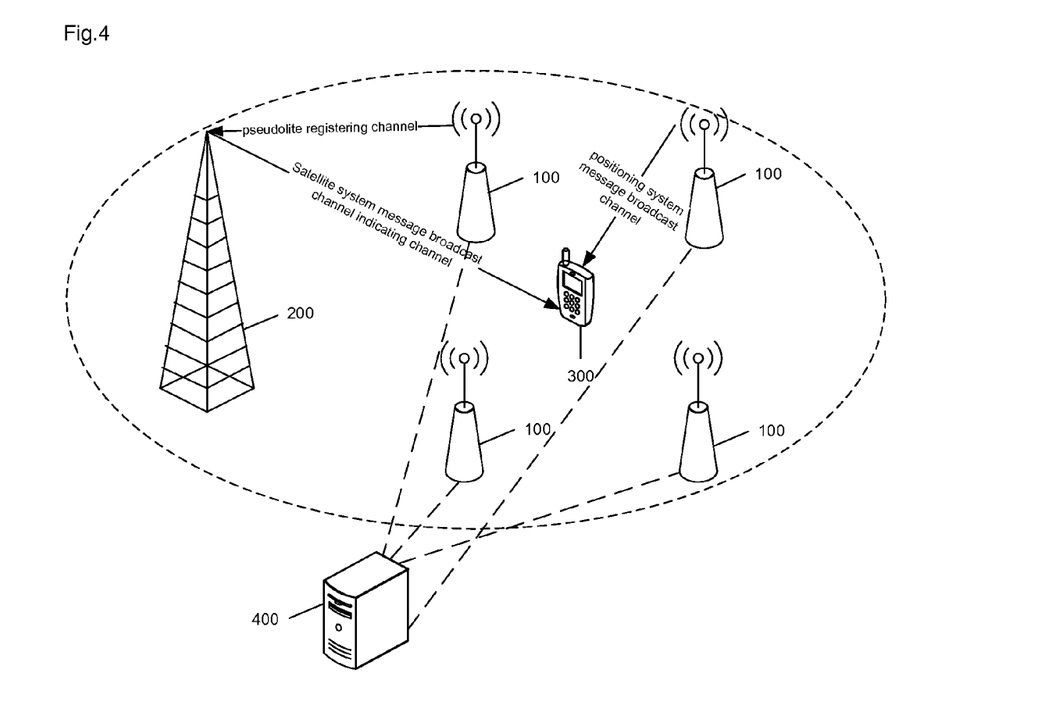
FIG. 4 is a diagram of a structure of a pseudolite positioning system according to an embodiment herein.

An embodiment herein may further provide a pseudolite positioning system. As shown in FIG. 4, the pseudolite positioning system may include: at least one wireless access point 200, at least one radio positioning UE 300, two or more devices 100 for sending a pseudolite positioning signal, and a managing unit 400 for managing a device for sending a pseudolite positioning signal.

Function of a device 100 for sending a pseudolite positioning signal is as described in an embodiment corresponding to FIG. 2. Function of the wireless access point 200 is as described in an embodiment corresponding to FIG. 3. Function of the at least one radio positioning UE 300 is as described in a corresponding embodiment.

The managing unit 400 may be configured for: acquiring a node parameter of a device 100 for sending a pseudolite positioning signal and a node parameter of a device for sending a pseudolite positioning signal adjacent to or close to the device 100 for sending a pseudolite positioning signal.

The managing unit 400 may be configured for: sending the device 100a, 100b, 100c for sending a pseudolite positioning signal adjacent to or close to the device 100 for sending a pseudolite positioning signal at least one node parameter of the device 100 for sending a pseudolite positioning signal through a downlink channel of the at least one wireless access point 200.

The at least one radio positioning UE 300 may be configured for: acquiring, from a pseudolite positioning system message broadcast channel indicating channel of the at least one wireless access point 200, a positioning system message broadcast channel indication indicating a positioning system message broadcast channel of a device 100 for sending a pseudolite positioning signal. The at least one radio positioning UE 300 may be configured for: accessing the positioning system message broadcast channel indicated by the positioning system message broadcast channel indication; acquiring, from the positioning system message broadcast channel, the node parameter(s) of the device 100a, 100b, 100c for sending a pseudolite positioning signal adjacent to the device 100 for sending a pseudolite positioning signal. The at least one radio positioning UE 300 may be configured for: searching, according to such parameters, for a positioning signal sent by a device 100, 100a, 100b, 100c for sending a pseudolite positioning signal; acquiring a parameter for position estimation; and performing measurement and/or positioning accordingly.

The managing unit 400 may be configured for: configuring, through the at least one wireless access point 200, operating mode configuration for configuring an operating mode of a device 100 for sending a pseudolite positioning signal. The operating mode configuration may include at least one of:

a transmitting power of a positioning signal transmitting Channel;

a transmitting timing of the positioning signal transmitting Channel;

a transmitting frequency of the positioning signal transmitting Channel;

a duty cycle of the positioning signal transmitting Channel; and a positioning signal modulation mode.

The positioning system message broadcast channel and the positioning signal transmitting channel of a device 100 for sending a pseudolite positioning signal may perform sending in time with a benchmark time point on a downlink wireless frame of the at least one wireless access point 200 as a time reference point. A device 100 for sending a pseudolite positioning signal may indicate a time position occupied by a positioning system message broadcast channel relative to the time reference point.

In addition, the managing unit 400 may be implemented collaboratively by a CPU, an MPU, a DSP, or an FPGA in the pseudolite positioning system, and hardware having a communication function in the at least one wireless access point.

What described are merely embodiments of the disclosure and are not intended to limit the scope of the disclosure.

The invention claimed is:

1. A method for pseudolite system messaging, comprising:

receiving, by a pseudolite from a wireless access point through a receiving channel, control signaling, as well as a node parameter of a neighbor pseudolite adjacent to or close to the pseudolite;

sending, by the pseudolite on a positioning system message broadcast channel configured on the pseudolite, a node parameter of the pseudolite, and the node parameter of the neighbor pseudolite;

sending, by the pseudolite on the positioning system message broadcast channel, information on a positioning signal transmitting mode for transmitting a positioning signal by the pseudolite, and information on a positioning signal transmitting mode for transmitting a positioning signal by the neighbor pseudolite; and sending, by the pseudolite through a positioning signal transmitting channel, a radio positioning signal, such that a radio positioning User Equipment UE performs positioning signal measurement and/or positioning according to the node parameters acquired from the positioning system message broadcast channel, wherein the node parameter of a pseudolite comprises information on a pseudo random sequence used in a positioning signal transmitted by the pseudolite.

2. The method according to claim 1, wherein the information on the positioning signal transmitting mode corresponding to a pseudolite comprises information on a period of time in which a positioning signal is transmitted and/or information on a period of time in which no positioning signal is transmitted.

3. The method according to claim 1, wherein the node parameter of a pseudolite comprises information on geographical coordinates of the pseudolite.

4. A pseudolite, comprising:

a processor; and a non-transitory computer-readable storage medium storing an instruction executable by the processor, wherein the processor is configured for:

receiving, from a wireless access point through a receiving channel, control signaling, as well as a node parameter of a neighbor pseudolite adjacent to or close to the pseudolite:

sending, on a positioning system message broadcast channel configured on the pseudolite, a node parameter of the pseudolite, and the node parameter of the neighbor pseudolite;

sending, on the positioning system message broadcast channel, information on a positioning signal transmitting mode for transmitting a positioning signal by the pseudolite, and information on a positioning signal transmitting mode for transmitting a positioning signal by the neighbor pseudolite; and sending, through a positioning signal transmitting channel, a radio positioning signal, such that a radio positioning User Equipment UE performs positioning signal measurement and/or positioning according to the node parameters acquired from the positioning system message broadcast channel, wherein the node parameter of a pseudolite comprises information on a pseudo random sequence used in a positioning signal transmitted by the pseudolite.

5. The pseudolite according to claim 4, wherein the information on the positioning signal transmitting mode corresponding to a pseudolite comprises information on a period of time in which a positioning signal is transmitted and/or information on a period of time in which no positioning signal is transmitted, wherein the node parameter of a pseudolite comprises information on geographical coordinates of the pseudolite.

6. The pseudolite according to claim 4, wherein the processor is further configured for:

receiving, from the wireless access point through the receiving channel, operating mode configuration for configuring an operating mode of the pseudolite, wherein the operating mode configuration comprises at least one of:

a transmitting power of the positioning signal transmitting Channel;

a transmitting timing of the positioning signal transmitting Channel;

a transmitting frequency of the positioning signal transmitting Channel;

a duty cycle of the positioning signal transmitting Channel; and a positioning signal modulation mode, wherein the processor is further configured for: sending, through a pseudolite registering channel, the wireless access point the node parameter of the pseudolite, the node parameter of the pseudolite comprising at least one of:

information on geographical coordinates of the pseudolite;

a maximal transmitting power of the pseudolite; and an operating frequency band supported by the positioning signal transmitting channel of the pseudolite.

7. A pseudolite positioning system, comprising: at least one wireless access point, at least one radio positioning User Equipment UE, two or more pseudolites according to claim 4; and a pseudolite managing unit, comprising:

a second processor; and a second non-transitory computer-readable storage medium storing an instruction executable by the processor, wherein the second processor is configured for: acquiring a node parameter of a pseudolite and a node parameter of a neighbor pseudolite adjacent to or close to the pseudolite; sending the neighbor pseudolite at least one node parameter of the pseudolite through a downlink channel of the at least one wireless access point, wherein the at least one wireless access point is configured for: sending, through a channel indicating channel, a channel indication to a radio positioning UE in a service area of the wireless access point, the channel indication indicating a positioning system message broadcast channel configured on a pseudolite;

wherein the at least one radio positioning UE is configured for:

receiving a channel indication sent by a wireless access point, the channel indication indicating a positioning system message broadcast channel configured on a pseudolite;

accessing the positioning system message broadcast channel indicated by the channel indication; acquiring, from the positioning system message broadcast channel, a node parameter of the pseudolite, and a node parameter of a neighbor pseudolite adjacent to or close to the pseudolite.

8. The system according to claim 7, wherein the second processor is further configured for: configuring, through the at least one wireless access point, operating mode configuration for configuring an operating mode of a pseudolite, the operating mode configuration comprising at least one of:

a transmitting power of a positioning signal transmitting Channel;

a transmitting timing of the positioning signal transmitting Channel;

a transmitting frequency of the positioning signal transmitting Channel;

a duty cycle of the positioning signal transmitting Channel; and a positioning signal modulation mode.

* * * * *